March 27, 1962 L. L. MARRAFFINO 3,027,052
DIAL OPERATED DISPENSER
Filed July 14, 1958

INVENTOR
LEONARD L. MARRAFFINO

BY *Adams, Forward and McLean*
ATTORNEYS 3,027,052
DIAL OPERATED DISPENSER
Leonard L. Marraffino, 231 E. 4th St.,
Mount Vernon, N.Y.
Filed July 14, 1958, Ser. No. 748,442
3 Claims. (Cl. 222—282)

My invention relates to containing and dispensing fluent materials, and in particular, provides a container-dispenser from which contained material can be dispensed in accurately predetermined amounts.

Frequently it is desirable to package fluent materials, particularly cosmetic creams and the like, in a jar or other container provided with a mechanical dispensing apparatus, thus among other benefits obviating the need of removing and replacing the conventional cap. Such mechanical dispensers are particularly desirable where failure to replace the conventional cap can cause hardening or drying out of the contents of the container, because of the large area of such contents which is exposed when the cap is removed.

When such mechanical dispensers are employed, however, it is usually difficult to estimate the precise quantity of material required and to control the dispenser to deliver such precise amount. Excess amounts of material, therefore, are often removed in the operation of mechanical dispensers and, accordingly, wastage occurs, as such excess materials cannot readily be returned to the container-dispenser. The disposal of such excess materials, moreover, particularly in the case of face creams, deodrant creams, and the like is a difficult and messy operation.

It is thus a principal object of my invention to provide a control device for such mechanical dispensers which facilitates an estimate of the amount of material to be dispensed for a particular application and which then permits the estimated amount of material to be dispensed accurately.

Essentially this and other objects of my invention which will become more apparent hereinafter are obtained by employing a container-dispenser in which the mechanical dispenser employs a rotary operator to dispense contained material from a chamber or the like through an expelling passage, for example, by driving a piston through the chamber. Such container-dispensers usually require the employment of an external control member which is connected to the rotary operator and which upon manual rotation rotates the operator to cause the materials in the container to be dispensed.

In keeping with the principles of my invention, I modify the rotatable control member by providing a series of finger tip receiving recesses which are disposed about the control member such that as the control member is rotated the recesses follow a common circular path. In addition, I provide a stop bar which is mounted on the container and which has a portion overlying the common path of the finger tip receiving recesses. Thus, by equally spacing the recesses, the angular movement of the control member can be limited to multiples of a discreet increment, as a finger tip placed in one of the recesses and pulled around to a position in which the finger tip strikes the stop bar will rotate the control member through an angle equal to a multiple of the angular separation of the recesses. Since such container-dispensers provided with a rotary operator generally are positive displacement devices, the regulation of the angular rotation of the control member into multiples of fixed angles afforded by my invention assures that a preselected quantity of material can be dispensed consistently by "dialing" the control member from the same finger tip receiving position around to the stop bar. Since the user, moreover, knows how much movement was required in obtaining a given quantity, the required movement for a given application can quickly be determined, after which the dispensing of excess material can be avoided.

In a more specific aspect, I contemplate directing the expelling passageway through the center of the control member which I locate on the top of the container-dispenser thus permitting the dispenser to be operated conveniently with one hand.

For a more complete understanding of the practical application of the principles of my invention, reference is made to the appended drawings, in which.

Figure 3:
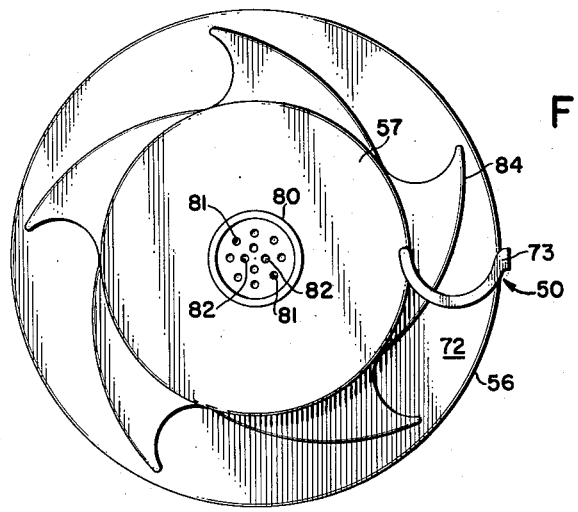
FIGURE 3 is a plan view of the device shown in FIGURE 2.

Referring to the drawings, the reference numeral 50 designates a container-dispenser for simultaneously dispensing two separately contained materials, and constructed in accordance with the invention disclosed and claimed in copending application S.N. 748,505, filed July 14, 1958, in the name of John J. Spero, now U.S. Patent No. 2,926,818. Container-dispenser 50 is equipped with a control device constructed in accordance with my invention and basically includes an outer barrel 51, an inner barrel 52, a central shaft 53, an annular piston 54, a smaller annular piston 55, a receiving ring 56 and a dispensing head or central member 57 incorporating the control function provided by my invention.

Barrel 51 is a cylindrical container constructed of clear, rigid plastic material having an open top and a closed bottom 58. Internally bottom 58 of barrel 51 is provided with a shallow well 59 circular in cross-section and having a diameter approximately half that of barrel 51. Well 59 is centrally located on the inner bottom 58 and at its center there is located a second well 60 having relatively short transverse dimensions and which is square in cross-section. At its open upper end barrel 51 is externally threaded as indicated by the reference numeral 61, and throughout its cylindrical length, the interior surface of barrel 51 is provided with a boss 49 which extends vertically and functions as a key.

Inner barrel 52 is a cylindrical container constructed of clear, rigid plastic material having a substantially closed bottom 62. The external diameter of barrel 52 is just less than the diameter of well 59 in barrel 51, such that barrel 52 rests with its bottom 62 received in well 59 in a close sliding fit and thus is positioned coaxially within barrel 51. At its center bottom 62 of barrel 52 is provided with an axial bore 63 which registers with well 60 in bottom 58 of barrel 51. The external cylindrical surface of barrel 52 throughout substantially the entire length of barrel 52 is provided with a right hand thread indicated by the reference numeral 64. Interiorly barrel 52 is provided with a boss 65 which extends longitudinally the entire length of barrel 52 and functions as a key. The open upper end of barrel 52 terminates with a series of radial splines 66.

Shaft 53, which is constructed of clear, rigid plastic material, is provided with a left hand thread 67 substantially throughout its length. At one end it is provided with a smooth conical point 68, and at its other end it is provided with a short, smooth cylindrical portion 69 terminating in a square cross-section portion 70. Shaft 53 is positioned on the common axis of barrels 51 and 52 with its square cross-sectioned end 70 resting in square cross-sectioned well 60 in bottom 58 of barrel 51, with its cylindrical portion 69 adjacent to end portion 70 extending through bore 63 in the bottom 62 of barrel 52 and with its smooth conical point 68 at the upper end of the assembly.

Receiving ring 56 for dispensing head 57 is a generally annular piece of rigid, plastic material which is interiorly threaded at its lower end as indicated by the reference numeral 71 for threaded engagement with threads 61 on the upper end of barrel 51. The upper side of receiving ring 56 provides a flat annular surface 72 which extends inwardly partly over the annular space defined between the inner wall of barrel 51 and the outer threaded wall of inner barrel 52.

Dispensing head 57 is a block of rigid plastic material of generally cylindrical appearance. About its periphery dispensing head 57 is provided with a groove 74 which is received by the inner edge of annular receiving ring 56 in a smooth, sliding, rotatable fit sufficiently tight to provide continuous sealing contact between receiving ring 56 and dispensing head 57. Thus receiving ring 56 rotatably retains dispensing head 57 over the open tops of barrels 51 and 52 thereby closing the interior of the assembly.

On its underside dispensing head 57 is provided with an annular boss 75 which is centered about the common axis of barrels 51 and 52 and shaft 53 and which is positioned aligned with the upper end of barrel 52. The under edge of boss 75 is provided with a series of radial splines 76 which mate tightly with splines 66 on the upper edge of inner barrel 52 thus separating the annular space between barrels 51 and 52 from the central space within barrel 52, and also retaining head 57 and inner barrel 52 together as a common rotatable unit.

Centrally on its under side dispensing head 57 is provided with a depending sleeve 77 which rotatably receives the upper end 68 of shaft 53. Between its outer edge and annular boss 75 the under side of dispensing head 57 is provided with an annular groove 78. Similarly between annular boss 75 and sleeve 77 the under side of dispensing head 57 is provided with an annular groove 79.

On its upper side, where it projects above the level of surface 72 of receiving ring 56, dispensing head 57 is centrally provided with a short, integral, vertical tube 80 which forms the dispensing orifice for container-dispenser 50. A series of inclined bores 81 extend through dispensing head 57 connecting groove 78 and the interior of orifice 80, thus providing expelling passages leading from the annular space between barrels 51 and 52 to dispensing orifice 80. Similarly a series of inclined bores 82 are provided in dispensing head 57 which lead from groove 79 on the under side of dispensing head 57 to orifice 80 thereby providing expelling passages for the central space within barrel 52. Orifice 80 can be provided with cap 83 which snap fits over orifice 80.

Annular piston 54 is positioned coaxially between barrels 51 and 52 and on its under side is shaped to fit flat against bottom 58 of barrel 51 entirely across the distance between barrels 51 and 52. The upper surface of piston 50 is shaped to fit snugly into groove 78 in dispensing head 57, and the center aperture of piston 54 is internally threaded as indicated by the reference numeral 85 to engage threads 64 on barrel 52. On its outer edge piston 54 is provided with a vertical slot 86 which snugly receives boss 49. Thus clockwise rotation of dispensing head 57, which by reason of the mating splines 66 and 76 rotates inner barrel 52 relative to outer barrel 51, causes piston 54 to rise in the annular space between barrels 51 and 52.

Piston 55 is positioned about shaft 53 across the central space within barrel 52 and like piston 54 is shaped on its under side to fit flat against the bottom 62 of barrel 52 extending between shaft 53 and the inner wall of barrel 52, and on its upper surface to fit snugly into groove 79 on the under side of dispensing head 57. The central aperture of piston 55 is internally threaded as indicated by the reference numeral 87 rotatably to engage threads 67 on shaft 53. The outer edge of piston 55 is provided with a vertical slot 88 which slidingly receives boss 65 on the inner wall of barrel 52. Since shaft 53 cannot rotate relative to outer barrel 51 by reason of the square cross-section 70 at its lower end received in square cross-sectioned well 60, clockwise rotation of dispensing head 57 thus rotates inner barrel 52 relative to shaft 53 and causes piston 55 to rise in the central space within barrel 52.

Figure 2:
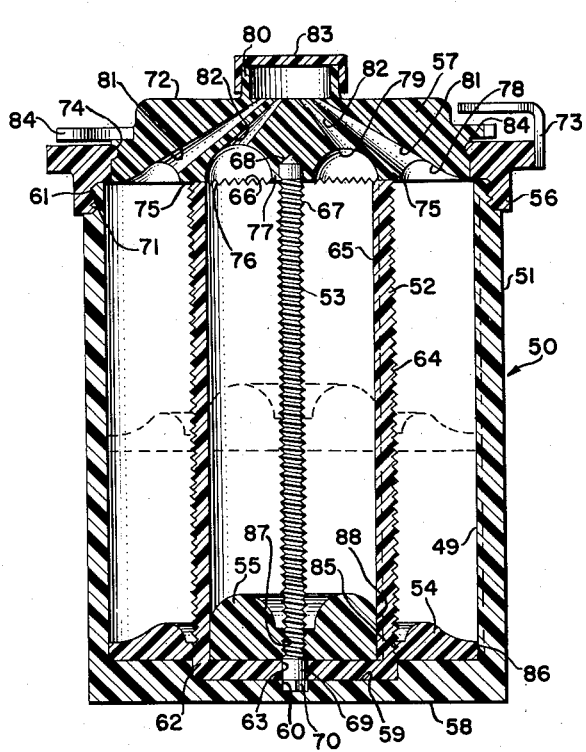
FIGURE 2 is a vertical section of the container-dispenser shown in FIGURE 1.

Insofar as container-dispenser 50 has been described above, it essentially embodies the principles disclosed in the aforenoted application of John J. Spero. It will be apparent that container-dispenser 50 is operated by rotating dispensing head 57 clockwise as seen in FIGURE 2, which causes pistons 54 and 55 to rise simultaneously within container-dispenser 50, thus forcing the contents of the container through expelling passages 81 and 82 and out through orifice 83.

In adapting container-dispenser 50 in accordance with my invention, I further provide dispensing head 57 with a series of arms 84 which are spaced at arcuate intervals about the periphery of dispensing head 57 and which extend outwardly from dispensing head 57 overlying the upper surface 72 of receiving ring 56. On one side receiving ring 56 carries an integral angled extension rod 73 which rises vertically above the plane of surface 72. Rod 73 extends inwardly spaced above surface 72 and is curved to function as a finger stop bar. Arms 84 are relatively thin vertically and are positioned such that they ride beneath the inner, stop bar extension of angled rod 73. Arms 84, moreover, are relatively thick in a horizontal direction and along their left-hand edges, as viewed from the center of rotation from dispensing head 57, are each cut in a concave curve defining a recess for receiving a finger tip, which can thus be applied to rotate dispensing head 57 and consequently inner barrel 52 in a clockwise direction.

Figure 1:
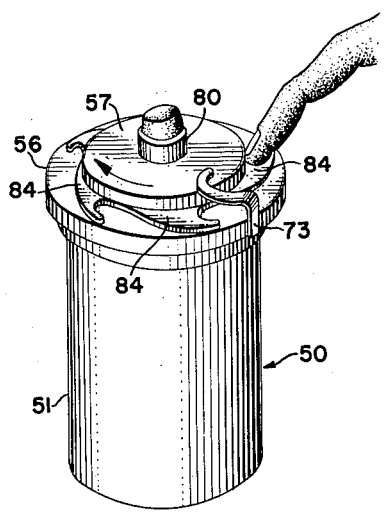
FIGURE 1 is a perspective view of a container-dispenser constructed in accordance with the principles of my invention.

In operation receiving ring 56 is threadedly disengaged from outer barrel 51 to remove dispensing head 57. With pistons 54 and 55 at their lowermost positions, the annular space between barrel 51 and barrel 52 is charged with one material to be dispensed, and the central space within barrel 52 is charged with a second material to be dispensed. Dispending head 57 is then repositioned over the assembly and receiving ring 56 threadedly engaged securely on the upper end of barrel 51 bringing splines 76 tightly into engagement with splines 66. Thereafter when it is desired to dispense the contents of container-dispenser 50 with cap 83 removed, user places his finger against an arm 84 of dispensing head 57 (see FIGURE 1) and rotates dispensing head 57 clockwise. Pistons 54 and 55 are thereby raised simultaneously (see dashed line in FIGURE 7) forcing the contents of container-dispenser 50 upwardly and out through expelling passages 81 and 82 through orifice 80 where the separately contained charges are simultaneously dispensed (see FIGURE 1).

It will be observed that in so rotating dispensing head 57, the operator's finger pushing an arm 84 is prevented from doing so when it reaches the position of rod 73. Rod 73 thus acts as a stop and by initiating the dispensing action with the operator's finger positioned a preselected number of arms 84 counter-clockwise from rod 73, preselected multiples of a fixed increment of a dispensed material can be obtained, thus permitting the operator to pre-select a desired quantity of material to be dispensed.

It will be evident that the container-dispenser of my invention is susceptible of many variations in the construction of finger tip receiving recesses. It will also be evident that although I have shown my invention with reference to a device for separately containing and simultaneously dispensing two materials, the device of my invention is equally useful where a single material is to be stored and dispensed, so long as the dispenser action requires a rotary operator, in the illustrated case barrel 64, which can conveniently be externally connected to a rotary control member, in the illustrated case dispensing head 57, to cause expulsion of the contents of the the container.

I claim:

1. In a container-dispenser including a container defining a material receiving chamber, an expelling passageway connected to such chamber, a rotary operator, and a control member rotatably mounted externally on said container and connected to said operator whereby rotation of said control member rotates said operator to force material in said chamber through said expelling passageway, the improvement in which said expelling passageway is formed in said control member extending centrally therethrough, in which said control member overlies a portion of the exterior surface of said container, and which further includes means defining a plurality of fingertip receiving recesses in said control member disposed at intervals thereabout to follow a common circular path overlying said exterior surface portion of said container as said member is rotated, and a stop-bar affixed to said container having a portion overlying said common path of said recesses.

2. The improvement according to claim 1 in which said recesses are located at equal arcuate intervals along said circular path.

3. The improvement according to claim 1 in which said means defining said recesses includes a plurality of arms mounted about said control member.

References Cited in the file of this patent

UNITED STATES PATENTS

| | | |
|---|---|---|
| 1,971,127 | Arnold et al. | Aug. 21, 1934 |
| 2,072,938 | Berg | Mar. 9, 1937 |
| 2,335,049 | Finkelstein | Nov. 23, 1943 |
| 2,540,511 | Coleman | Feb. 6, 1951 |
| 2,618,414 | Matlas | Nov. 18, 1952 |
| 2,656,953 | Rich | Oct. 27, 1953 |
| 2,695,118 | Taylor | Nov. 23, 1954 |
| 2,826,339 | Maillard | Mar. 11, 1958 |